June 2, 1925.　　　　　　　L. L. SARGENT　　　　　　　1,539,959
FRUIT SQUEEZING DEVICE
Filed Nov. 22, 1924

Lesley L. Sargent,
Inventor

Patented June 2, 1925.

1,539,959

UNITED STATES PATENT OFFICE.

LESTER L. SARGENT, OF WASHINGTON, DISTRICT OF COLUMBIA.

FRUIT-SQUEEZING DEVICE.

Application filed November 22, 1924. Serial No. 751,653.

*To all whom it may concern:*

Be it known that I, LESTER L. SARGENT, a citizen of the United States, residing at Washington, in the District of Columbia, have invented a new and useful Fruit-Squeezing Device, of which the following is a specification.

The object of my invention is to provide a novel and efficient fruit squeezing device for squeezing the juice or fruit to be used in making jellies; to provide an implement of this sort which may be operated without getting the hands stained with fruit juice; to provide a device of this kind having the fewest possible parts; to provide a device that can be readily washed and cleaned; and for other purposes; and to provide a novel form of bail.

I attain these and other objects of my invention by the device illustrated in the accompanying drawings in which—

Like numerals indicate like parts in each of the several views.

Referring to the accompanying drawings, I provide a tube 1 terminating in a bell 2 and having internal spiral grooves 3 extending through the tube 1.

Figure 2:
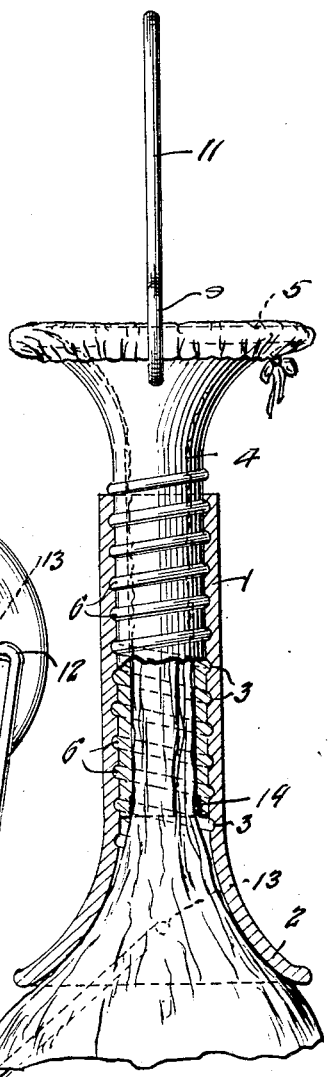
Fig. 2 is a vertical section on line 2—2 of Fig. 1.

I provide a second tube 4 having upstanding screw threads adapted to engage in the grooves 3 of tube 1, as shown in Fig. 2. Tube 4 is provided with a bell 5.

Figure 1:
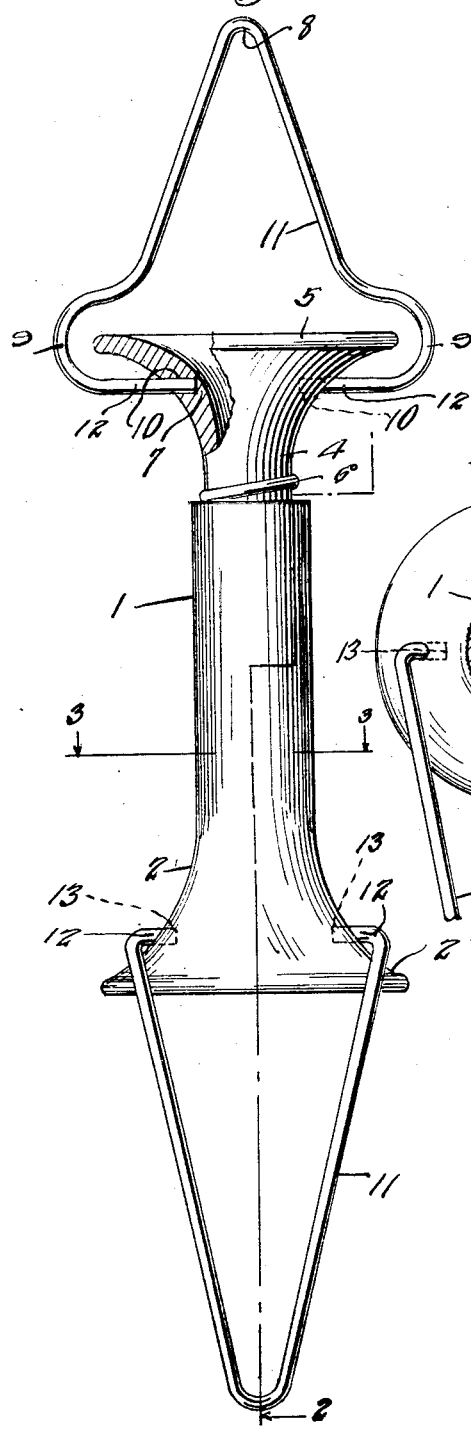
Figure 1 is a side elevation of the device, a portion being shown in section.
Figure 3:
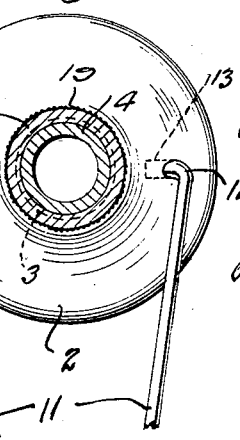
Fig. 3 is a transverse section on line 3—3 of Fig. 1.

I also prefer to provide suitable bails 11 having inturned end portions 12 engaging any suitable openings in the bells, such as the openings 10 in bell 5 and the openings 13 in bell 2. The bells may preferably be thickened as at 7, illustrated in Fig. 1, to provide a more secure engagement for the bail ends 12. I may provide one of the bails with the bulge portions 9 to permit of its being swung around the bell for the purpose of suspending the device by this bail, the portion 8 of the bail being engaged over any suitable nail, cord or faucet handle or other object from which the device may be conveniently suspended.

In using the implement, the fruit is placed in a suitable fabric bag having a long neck and a cord threaded through the back near its upper edge. The cord and neck of the bag are drawn through the tube 4 and over the bell 5 and the cord is then drawn taut and tied in the manner illustrated in Fig. 2. The device is then suspended by bail 11 to any convenient hook, nail or faucet handle and the tube 1 is rotated by means of the lower bail 11, thus exerting increased pressure on the bag and its fruit contents, thus squeezing the juice out and into a pan placed beneath.

My invention provides an easy and effective device for squeezing the juice from berries or other fruits without getting the hands stained with fruit juice and it eliminates a considerable part of the manual labor attendant on the making of jellies and marmalades of certain kinds.

What I claim is:

1. In a fruit squeezing device, the combination of interlocking tubes spirally threaded to adjustably engage one another, each of said tubes having a bell portion at one end.

2. In a fruit squeezing device, the combination of a tubular member having a bell portion, said member being interiorly spirally grooved, a second tubular member having an exteriorly projecting spiral thread said thread being engageable with the spiral groove of the first tube, said second tube also having a bell portion.

3. In a fruit squeezing device, the combination of a tubular member having a bell portion, said member being interiorly spirally grooved, a second tubular member having an exteriorly projecting spiral thread engageable with the spiral groove of the first tubular member, said second tubular member also having a bell portion, and operating elements attached to the respective bells for rotating same.

4. In a fruit squeezing device, the combination of a tubular member having a bell portion, said member being interiorly spirally grooved, a second tubular member having an exteriorly projecting spiral thread engageable with the spiral groove of the first tubular member, said second tubular member also having a bell portion, and bails attached to the bell portions of the respective members.

LESTER L. SARGENT.